(12) United States Patent
Sakaguchi

(10) Patent No.: US 6,810,738 B2
(45) Date of Patent: Nov. 2, 2004

(54) ACCELERATION MEASURING APPARATUS WITH CALIBRATION FUNCTION

(75) Inventor: Isao Sakaguchi, Saitama (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 10/456,832

(22) Filed: Jun. 9, 2003

(65) Prior Publication Data

US 2004/0007064 A1 Jan. 15, 2004

(30) Foreign Application Priority Data

Jul. 10, 2002 (JP) .................................. 2002-200868

(51) Int. Cl.[7] .............................................. G01P 15/00
(52) U.S. Cl. ...................................... 73/510; 73/514.01
(58) Field of Search .......................... 73/514.01, 514.33, 73/514.29, 514.36, 514.21, 514.23, 882.634, 510, 497; 702/141; 338/2, 5

(56) References Cited

U.S. PATENT DOCUMENTS

| | | | | |
|---|---|---|---|---|
| 4,430,895 A | * | 2/1984 | Colton | 73/497 |
| 4,967,605 A | * | 11/1990 | Okada | 73/862.044 |
| 5,295,386 A | * | 3/1994 | Okada | 73/1.07 |
| 5,485,749 A | * | 1/1996 | Nohara et al. | 73/514.33 |
| 5,589,634 A | * | 12/1996 | Nagahara et al. | 73/514.33 |

FOREIGN PATENT DOCUMENTS

| | | | |
|---|---|---|---|
| JP | 9-229962 | * | 9/1997 |
| JP | 11-160348 | * | 6/1999 |
| JP | 3111017 B2 | | 9/2000 |

* cited by examiner

Primary Examiner—Helen Kwok
(74) Attorney, Agent, or Firm—Sughrue Mion, PLLC

(57) ABSTRACT

An acceleration measuring apparatus capable of calibrating its output with a zero-point in the state of no acceleration applied as well as sensitivity. An acceleration sensor detects each component of an acceleration and creates an output based on each of the detected components in each direction of at least two mutually perpendicular axes of orthogonal coordinates for the acceleration sensor. The acceleration sensor is held at at least two different positions; each of the acceleration sensor axes at one position is at a angle, with the gravitational acceleration direction, that is different from the angle at the other position. A processing circuit develops calibration parameters based on output by each component in the at least two axis directions of the gravitational acceleration measured by the acceleration sensor positioned at each of the at least two different positions and calibrates the output of the acceleration measured by using the calibration parameters to provide a calibrated output.

22 Claims, 5 Drawing Sheets $(\theta = 30° \quad \phi = 45°)$ ($\theta = 0°$)

($\theta = 30°$  $\phi = 45°$)

ACCELERATION MEASURING APPARATUS WITH CALIBRATION FUNCTION

BACKGROUND OF THE INVENTION

1. Field of the Invention

The invention relates to an acceleration measuring apparatus that is used in automobiles, airplanes, industrial machines, cameras, portable terminals, medical equipment, watches, toys, game machines or the like for measuring vibrations, inclinations, travel distances and travel directions.

2. Description of the Related Art

Acceleration sensors have been widely used to measure vibrations, inclinations, travel distances and travel directions. Such acceleration sensors measure an electrical value, such as voltage, converted from a force produced due to an acceleration. However, since the sensitive section thereof has a variable characteristic because of production variation, the measured value cannot be used for any purpose as it is. Thus, the acceleration sensors have to be calibrated, by subjecting them to a known acceleration, so as to provide an output proportional to an acceleration.

The acceleration sensors have an x-axis directional sensor, a y-axis directional sensor and a z-axis directional sensor to measure respective accelerations in directions of three axes of orthogonal coordinates, that is, an x-axis, a y-axis and a z-axis. In calibration of sensitivity of such an acceleration sensor, each of the directional sensors has to be calibrated by sequentially aligning the x-, y- and z-axes with the gravitational acceleration direction. Japanese Patent No. 3,111,017 discloses a calibration method that reduces the inconvenience of such calibration involving calibrating each of the directional sensors by sequentially aligning the acceleration sensor with the three directions. According to the calibration method disclosed in the Japanese Patent, the acceleration sensor is mounted on a jig that allows components of a same magnitude of the gravitational acceleration to be applied to the x-axis, y-axis and z-axis directional sensors, so that sensitivities of the x-axis, y-axis and z-axis directional sensors can be calibrated simultaneously. According to this method, although the sensitivities, that is, outputs provided when an acceleration of 1G is applied to the sensor, can be calibrated simultaneously, a zero gravity state, that is, a zero-point cannot be calibrated.

In recent years, with the development of micromachine manufacture technology, highly sensitive acceleration sensors of the capacitance type and semiconductor piezoresistor type that can detect an acceleration of 1G or lower have become popular. Such highly sensitive acceleration sensors are often used to detect not only vibrations but also inclinations, travel distances or travel directions, and thus, it is essential for such sensors to calibrate a zero-point output level.

Furthermore, since the acceleration sensors provide a weak output, the output is necessarily amplified by means of an amplifier. It is required to calibrate the sensitivity and zero point of the amplified output. In addition, an acceleration measuring apparatus incorporates a processing device that stores calibration parameters and calibration formulas and performs data processing using the parameters and calibration formulas. Thus, it is required to calibrate not only the output of the acceleration sensor but also the amplified output and the output of the processing device.

SUMMARY OF THE INVENTION

The invention, therefore, has an object to provide an acceleration measuring apparatus that is able to calibrate its output with a zero-point in the state that no acceleration is applied as well as sensitivity.

Another object of the invention is to provide an acceleration measuring apparatus comprising an acceleration sensor and a data processing device for dealing with the sensor output from the data processing device.

Further object of the invention is to provide an acceleration measuring apparatus that calculates the output with calibration including output variations by ambient temperature.

It would be apparent from the description of the invention below that the invention has further objects to provide a calibration method of the acceleration measured by the acceleration measuring apparatus.

An acceleration measuring apparatus according to the invention comprises an acceleration sensor that detects each component of an acceleration and produces an output based on each of the detected components in each axis direction of at least two mutually perpendicular axes of orthogonal coordinates for the acceleration sensor, a holding means that holds the acceleration sensor at at least two different positions, in which the acceleration sensor axes at one position each is at an angle, with the gravitational acceleration direction, different from that at the other position, and a processing circuit. The processing circuit develops calibration parameters based on the output by each component in the at least two axis directions of the gravitational acceleration measured by the acceleration sensor positioned at each of the at least two different positions and calibrates the output created by the acceleration sensor based on each of the detected components of the acceleration in each of the at least two axis directions by using the calibration parameters to provide a calibrated output.

It is preferable that the acceleration sensor detects each component of the acceleration in each direction of three mutually perpendicular axes of orthogonal coordinates for the acceleration sensor and creates the output based on each of the detected components, and that the holding means holds the acceleration sensor at two different positions in which each of the acceleration sensor axes at one position is at a angle, with the gravitational acceleration direction different, from that at the other position.

In the acceleration measuring apparatus as described above, it is desirable that the processing circuit further comprises a memory, stores the obtained calibration parameters in the memory, and calibrates the output created by the acceleration sensor based on each of the detected components of the acceleration in each of the three axis directions by using the stored calibration parameters to provide the calibrated output.

The processing circuit preferably calibrates the output created by the acceleration sensor based on each of the detected components of the acceleration in each of the three axis directions by using the sensitivity and the zero-point output in each of the three axis directions, according to the following equation:

> Calibrated output=(the output based on each of the detected components of the acceleration−the zero-point output)/the sensitivity.

The acceleration measuring apparatus may further comprise a means for measuring an ambient temperature, and the processing circuit may develop temperature functions of calibration parameter, based on the output by each component in the three axis directions of the gravitational acceleration measured by the acceleration sensor positioned at each of the two different positions and calibrate the output created by the acceleration sensor based on each of the detected components of the acceleration by using the calibration parameters obtained with the ambient temperature by the temperature functions of calibration parameter to provide the calibrated output.

The temperature functions of calibration parameter preferably include a temperature function of output per unit magnitude of acceleration (hereinafter called "temperature function of sensitivity") in each of the three axis directions of the acceleration sensor and a temperature function of output of the acceleration sensor in each of the three axis directions without applied acceleration (hereinafter called "temperature function of zero-point output").

In the acceleration measuring apparatus as described above, it is desirable that the processing circuit further comprises a memory, stores the obtained temperature functions of calibration parameter in the memory, and calibrates the output created by the acceleration sensor based on each of the detected components of the acceleration in each of the three axis directions by using calibration parameters at the ambient temperature obtained with the ambient temperature by the stored temperature functions of calibration parameter to provide the calibrated output.

The processing circuit preferably calibrates the output created by the acceleration sensor based on each of the detected components of the acceleration in each of the three axis directions by using the sensitivity and the zero-point output at the ambient temperature calculated with the ambient temperature by the temperature functions of sensitivity and the temperature functions of zero-point output, respectively, according to the following equation:

Calibration output=(the output based on each of the detected components of the acceleration−the zero-point output)/the sensitivity.

BRIEF DESCRIPTION OF THE DRAWINGS

FIGS. 3(A)–3(B). shows examples of a semiconductor piezo-resistor type three-dimensional acceleration sensor used in the acceleration measuring apparatus of the invention, in which FIG. 3A is its perspective view and FIG. 3B is its plan view;

DETAILED DESCRIPTION OF THE PREFERRED EMBODIMENTS

EXAMPLE 1

Figure 1:
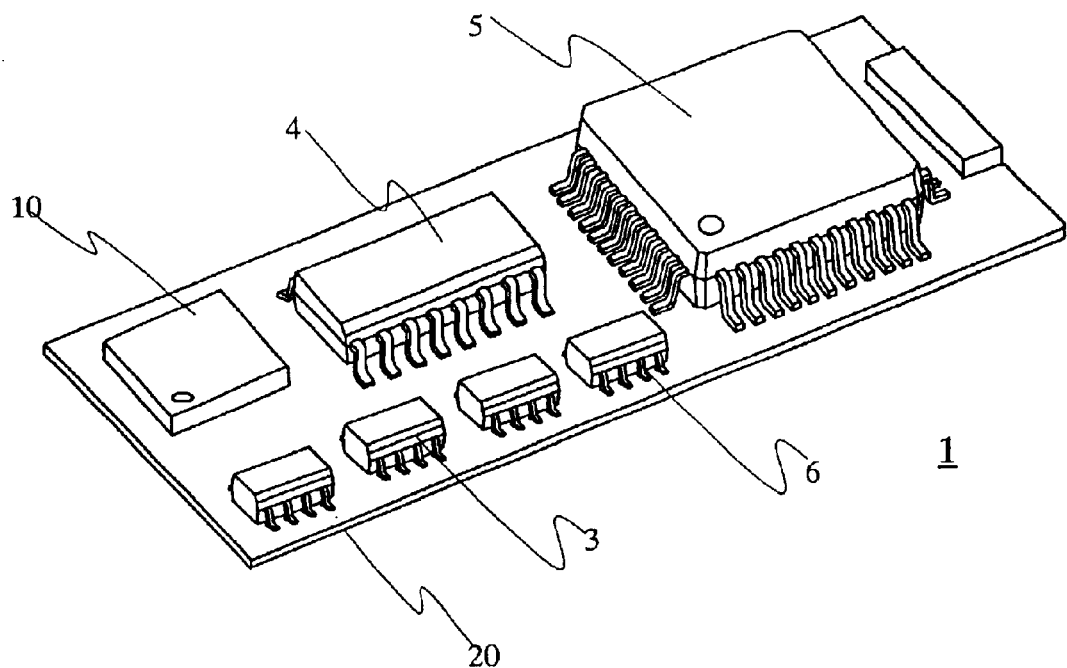
FIG. 1 shows an explanatory perspective view of an acceleration measuring apparatus according to the invention.
Figure 2:
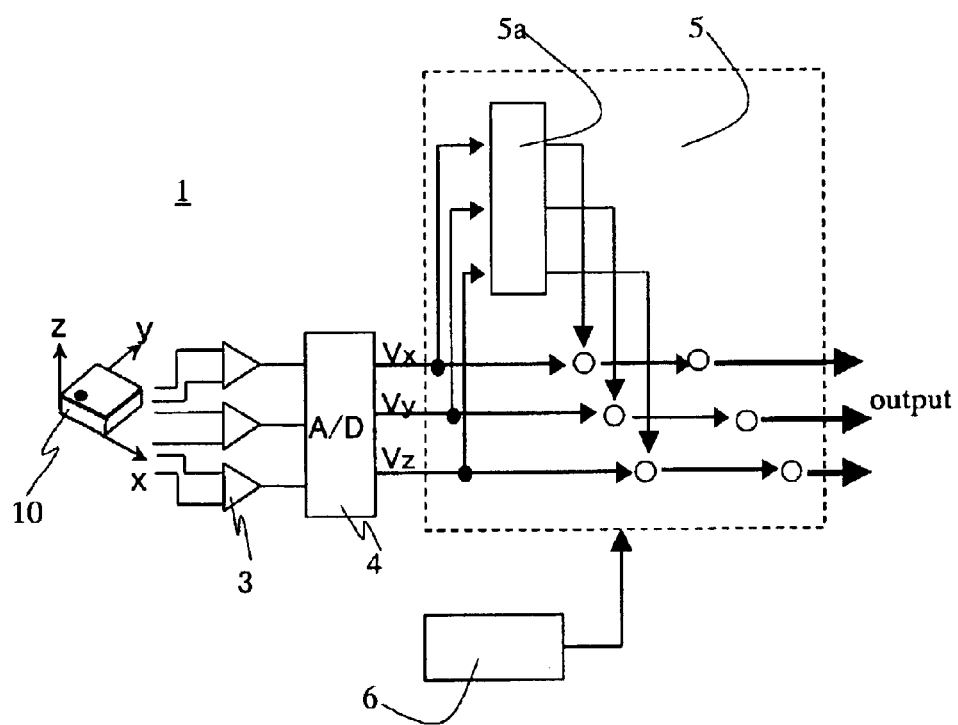
FIG. 2 is a block diagram showing a processing circuit installed in the acceleration measuring apparatus shown in FIG. 1.

An acceleration measuring apparatus according to the invention will be described in detail below with reference to the drawings. FIG. 1 is a perspective view of an acceleration measuring apparatus 1 according to the invention, and FIG. 2 is a block diagram of a processing circuit installed in the acceleration measuring apparatus 1 according to the invention. The acceleration measuring apparatus 1 comprises a printed wiring board 20, an acceleration sensor 10, an amplifier 3 for amplifying an output of the acceleration sensor 10, an A/D converter 4 for converting an analog signal to a digital signal, a memory for storing a calibration parameter, a microprocessor 5 for performing a calibration calculation, and a temperature sensor 6 for measuring an ambient temperature. Referring to FIG. 2, the microprocessor 5 includes a memory 5a. For the sake of clarity, identical components or parts are assigned the same reference numerals.

Figure 3A:
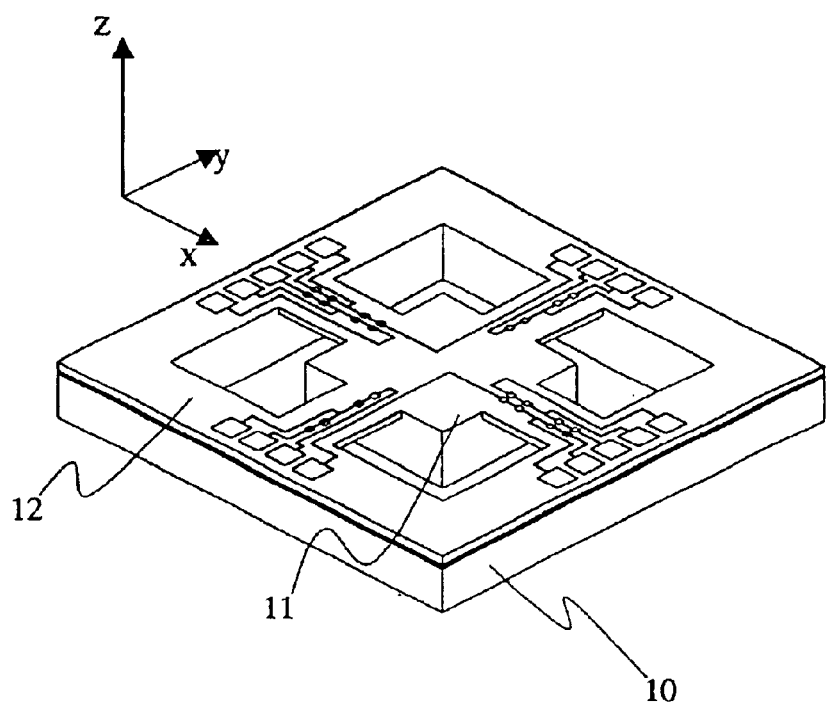
Figure 3B:
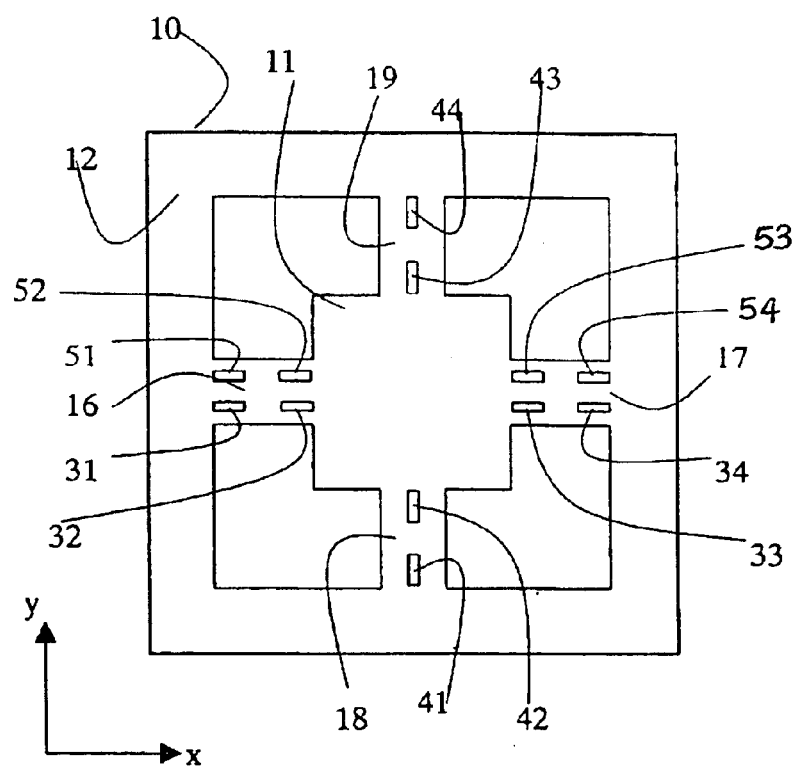

The acceleration sensor 10 is a semiconductor piezo-resistor type three-directional acceleration sensor sealed in a ceramic package. FIG. 3 is a schematic view of the semiconductor piezo-resistor type threedimensional acceleration sensor 10 implemented in the package. FIG. 3A is a perspective view of the sensor, and FIG. 3B is a plan view of the acceleration sensor 10 showing an arrangement of piezo-resistance elements (the wiring pattern and terminals are not shown). The sensor 10 is made of silicon and comprises a weight 11 at the center thereof, a frame 12 formed around the weight, and beams 16, 17, 18 and 19 that interconnect the weight 11 and the frame 12 in four directions.

In response to an external force, the weight 11 is displaced, whereby the beams 16, 17, 18 and 19 are deformed to generate a stress therein. Orthogonal coordinates are defined in such a manner that the beams 16 and 17 extend along the x-axis of the orthogonal coordinates, the beams 18 and 19 extend along the y-axis, and the z-axis extends perpendicular to and upward from the upper surface of the sensor. Piezo-resistance elements 31 and 32 for detecting an acceleration in the x-axis direction are mounted on the beam 16, and piezo-resistance elements 33 and 34 for detecting an acceleration in the x-axis direction are mounted on the beam 17. Piezo-resistance elements 41 and 42 for detecting an acceleration in the y-axis direction are mounted on the beam 18, and piezo-resistance elements 43 and 44 for detecting an acceleration in the y-axis direction are mounted on the beam 19. In addition, piezo-resistance elements 51 and 52 for detecting an acceleration in the z-axis direction are mounted on the beam 16, and piezo-resistance elements 53 and 54 for detecting an acceleration in the z-axis direction are mounted on the beam 17. Four piezo-resistance elements that detect accelerations in the respective axis directions constitute a bridge circuit. For example, if an acceleration in the x-axis direction is applied to the weight 11, the piezo-resistance elements 31 and 33 are subjected to a compressive stress, and the piezo-resistance elements 32 and 34 are subjected to a tensile stress. By applying a certain voltage of DC 5V, for example, to the bridge circuit, the bridge circuit can provide an output when an acceleration is applied to the weight.

Measurements of output sensitivity and zero-point output of the acceleration sensor 10 are shown in TABLE 1. As can be seen from the sensitivity in TABLE 1, the sensor outputs have small values, and therefore, are amplified about 100-fold by the amplifier for measurement. Thus, the sensitivity and zero-point output after amplification are both about 100 times larger in value than those before amplification. Thus, in the invention, the outputs after amplification, that is, the outputs of the acceleration measuring apparatus 1, are calibrated as described later.

TABLE 1

|  | x-axis sensor | y-axis sensor | z-axis sensor |
|---|---|---|---|
| Sensitivity (mV/G) | 3.5 | 3.6 | 4.0 |
| Zero-point output (mV) | 1.2 | −1.0 | 2.5 |

Figure 4:
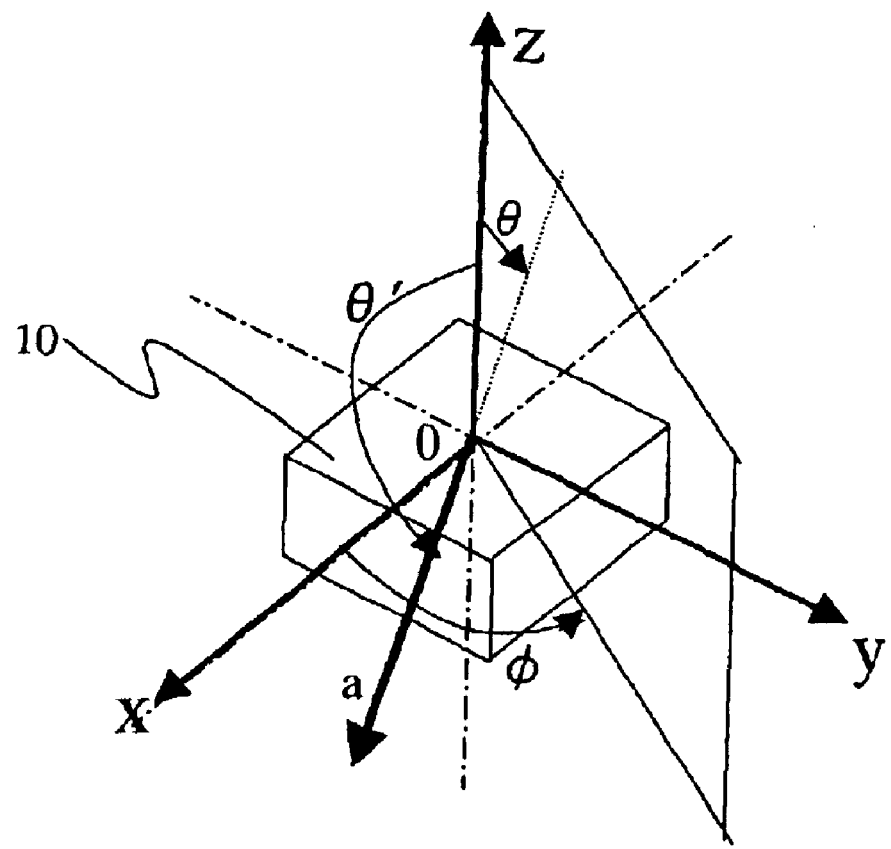
FIG. 4 shows an explanatory relationship of the perpendicular coordinate axes of the acceleration sensor and an applied acceleration.

FIG. 4 shows the orthogonal coordinates for the acceleration sensor 10 and an acceleration vector a applied to the acceleration sensor 10. The angle which the acceleration vector a forms with the z-axis of the orthogonal coordinates is θ', and the angle which a plane including the z-axis and the acceleration vector a forms with the x-axis is φ. The acceleration vector a is assumed to point downward for convenience in considering the gravitational acceleration. Assuming that the angle which the extension of the acceleration vector a in the +z direction forms with the z axis is θ, there is established a relation expressed by θ=180°−θ'. Thus, provided that the magnitude of the acceleration vector a is denoted by "a", the axis-directional components of the orthogonal coordinates of the acceleration vector a are expressed as follows.

$$ax = a \cdot \sin \theta' \cdot \cos \phi = a \cdot \sin \theta \cdot \cos \phi \quad (1)$$

$$ay = a \cdot \sin \theta' \cdot \sin \phi = a \cdot \sin \theta \cdot \sin \phi \quad (2)$$

$$az = a \cdot \cos \theta' = -a \cdot \cos \theta \quad (3)$$

On the other hand, the output of the acceleration measuring apparatus 1 having the acceleration sensor 10 can be expressed by the following formula.

Output=applied acceleration×sensitivity of acceleration measuring apparatus+zero-acceleration output  (4)

In this formula, the sensitivity of the acceleration measuring apparatus refers to the magnitude of an output thereof provided when an acceleration of unit magnitude is applied to the acceleration sensor, and the zero-acceleration output refers to an output of the acceleration measuring apparatus 1 provided when no acceleration is applied to the acceleration sensor 10.

Provided that an output voltage V of the acceleration measuring apparatus 1 when the acceleration vector a is applied to the acceleration sensor 10 is expressed as (Vx, Vy, Vz), where Vx, Vy and Vz denote the, axis-directional components of the orthogonal coordinates, each of the components can be expressed as follows based on the formula (4).

$$Vx = Vxs \cdot ax + Vx0 = Vxs \cdot a \cdot \sin \theta \cdot \cos \phi + Vx0 \quad (5)$$

$$Vy = Vys \cdot ay + Vy0 = Vys \cdot a \cdot \sin \theta \cdot \sin \phi + Vy0 \quad (6)$$

$$Vz = Vzs \cdot az + Vz0 = -Vzs \cdot a \cdot \cos \theta + Vz0 \quad (7)$$

In these formulas, Vxs, Vys and Vzs denote the axis-directional components of the sensitivity, and Vx0, Vy0 and Vz0 denote the axis-directional components of the zero-point acceleration output voltage.

Figure 5A:
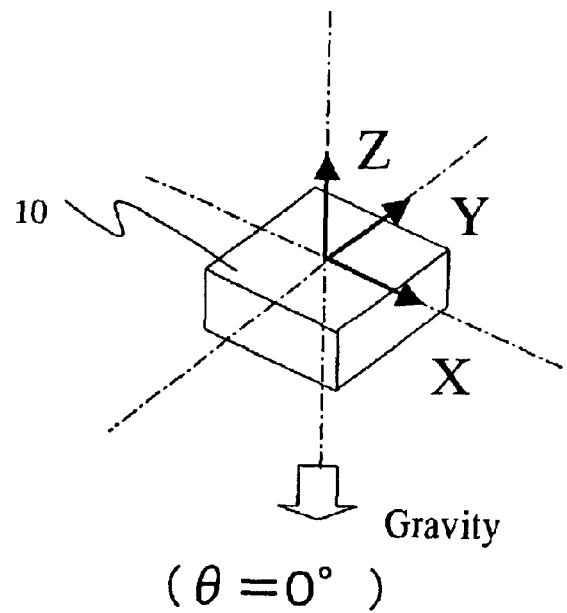
FIG. 5A is an explanatory diagram showing the position relationship θ: 0 degree between the acceleration sensor and the gravitational acceleration

The acceleration measuring apparatus 1 of the invention has holding means that holds the acceleration sensor 10 in two different positions with respect to the gravitational acceleration direction. In this EXAMPLE, the two different positions are those shown in FIGS. 5A and 5B. When the acceleration sensor 10 is in the position shown in FIG. 5A, the gravitational acceleration direction corresponds with the −z axis direction of the orthogonal coordinates. Thus, applying a relation of θ=0° to the formulas (5) to (7) results in the following formulas. Here, the output voltage (Vx, Vy, Vz) of the acceleration measuring apparatus 1 when in the first position, that is, the position shown in FIG. 5A is expressed by (Vx1, Vy1, Vz1).

$$Vx1 = Vx0 \quad (8)$$

$$Vy1 = Vy0 \quad (9)$$

$$Vz1 = -Vzs \cdot a + Vz0 \quad (10)$$

Since the magnitude a of the gravitational acceleration is 1G, the formula (10) results in the following formula.

$$Vz1 = -Vzs + Vz0 \quad (10')$$

Figure 5B:
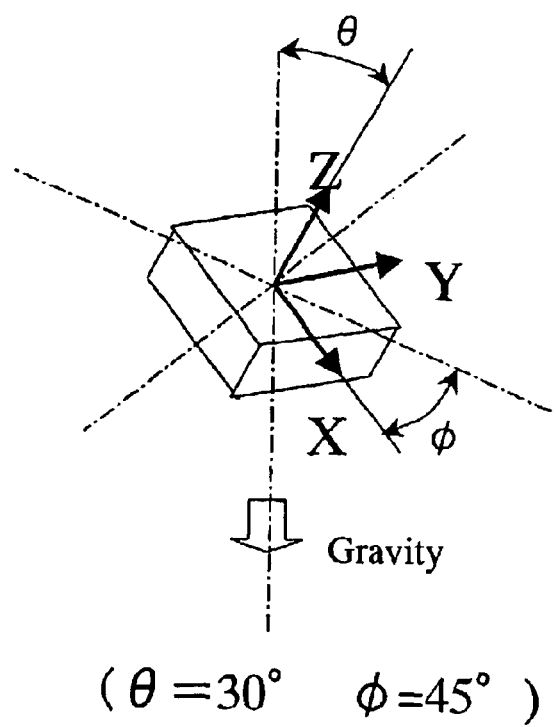
FIG. 5B shows the position relationship θ: 30 degrees and φ: 45 degrees between them.

In the position shown in FIG. 5B, the gravitational acceleration direction is expressed by θ=30° and φ=45°. Thus, the formulas (5) to (7) are further expressed as follows. Here, the output voltage (Vx, Vy, Vz) of the acceleration measuring apparatus 1 when in the second position, that is, the position shown in FIG. 5B is expressed by (Vx2, Vy2, Vz2).

$$Vx2 = Vxs/2\sqrt{2} + Vx0 \quad (11)$$

$$Vy2 = Vys/2\sqrt{2} + Vy0 \quad (12)$$

$$Vz2 = -\sqrt{3} \cdot Vzs/2 + Vz0 \quad (13)$$

Since the output voltages (Vx1, Vy1, Vz1) and (Vx2, Vy2, Vz2) of the acceleration measuring apparatus are measured, the zero-point output component Vx0 and the sensitivity component Vxs can be determined from the formulas (8) and (11), the zero-point output component Vy0 and the sensitivity component Vys can be determined from the formulas (9) and (12), and the zero-point output component Vz0 and the sensitivity component Vzs can be determined from the formulas (10') and (13).

The output voltage components (Vx1, Vy1, Vz1) of the acceleration measuring apparatus measured in the position shown in FIG. 5A were 123 mV, −101 mV and −151 mV, respectively. Furthermore, the output voltage components (Vx2, Vy2, Vz2) of the acceleration measuring apparatus measured in the position shown in FIG. 5B were 247 mV, 26 mV and −97 mV, respectively. The sensitivity (Vxs, Vys, Vzs) and the zero-point output (Vx0, Vy0, Vz0), which serve as calibration parameters, determined using the measurements are shown in TABLE 2.

TABLE 2

|  | x-axis sensor | y-axis sensor | z-axis sensor |
|---|---|---|---|
| Sensitivity (mV/G) | 351 | 359 | 403 |
| Zero-point output (mV) | 123 | −101 | 252 |

The calibration parameters shown in TABLE 2 were stored in the memory 5a. When an applied acceleration is measured, the microprocessor 5 can perform a calibration calculation to determine the applied acceleration by substituting the calibration parameters determined based on the output voltages of the acceleration measuring apparatus 1 and stored in the memory 5a in the following formula (14), which is derived from the formula (4).

Acceleration (calibrated output)=(detected output−zero-point output)/sensitivity  (14)

Theoretically, the resulting calibrated output is 0 when the applied acceleration is 0G, 1 when the applied acceleration is 1G, or 2 when the applied acceleration is 2G. Actual measurement in which a known acceleration was applied thereto resulted in a detection error of 1% or lower.

EXAMPLE 2

The acceleration sensor 10 was held by the holding means in-two different positions with respect to the orthogonal coordinates for the acceleration sensor 10 of the acceleration measuring apparatus 1 described with reference to EXAMPLE 1. In one of the positions, the gravitational acceleration direction was expressed by $\theta=10°$ and $\phi=20°$, and in the other position, the gravitational acceleration direction was expressed by $\theta=20°$ and $\phi=45°$. In each of the positions, the output voltages (Vx1, Vy1, Vz1) and (Vx2, Vy2, Vz2) of the acceleration measuring apparatus 1 were measured. Measurements (Vx1, Vy1, Vz1) for the position of $\theta=10°$ and $\phi=20°$ and measurements (Vx2, Vy2, Vz2) for the position of $\theta=20°$ and $\phi=45°$ were substituted in the formulas (5) to (7) to calculate the calibration parameters, that is, the sensitivity (Vxs, Vys, Vzs) and the zero-point output (Vx0, Vy0, Vz0). The calculated calibration parameters of sensitivity and zero-point output were stored in the memory 5a. Using calibration parameters determined based on output voltages for an applied acceleration measured by the acceleration measuring apparatus 1 and stored in the memory 5a, the microprocessor 5 can perform a calibration calculation based on the formula (14) to determine the applied acceleration. A known acceleration was applied to the acceleration sensor 10, output voltages for the acceleration components were each measured by the acceleration measuring apparatus, and then the magnitude of the applied acceleration was determined from the formula (14) using the measurements. The error between the magnitude of the acceleration determined from the formula (14) and the true magnitude of the known acceleration was 1% or lower.

EXAMPLE 3

Figure 6A:
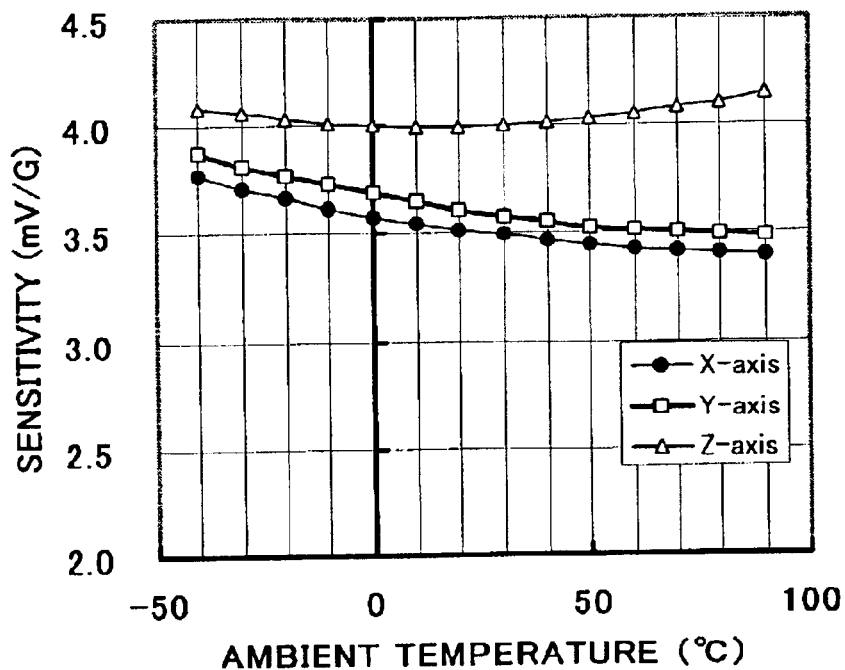
FIG. 6A is a graph showing a relationship between the sensitivity of the acceleration sensor used in the invention and ambient temperature and FIG. 6B is a graph showing a relationship between the zero-point output of the apparatus and ambient temperature.
Figure 6B:
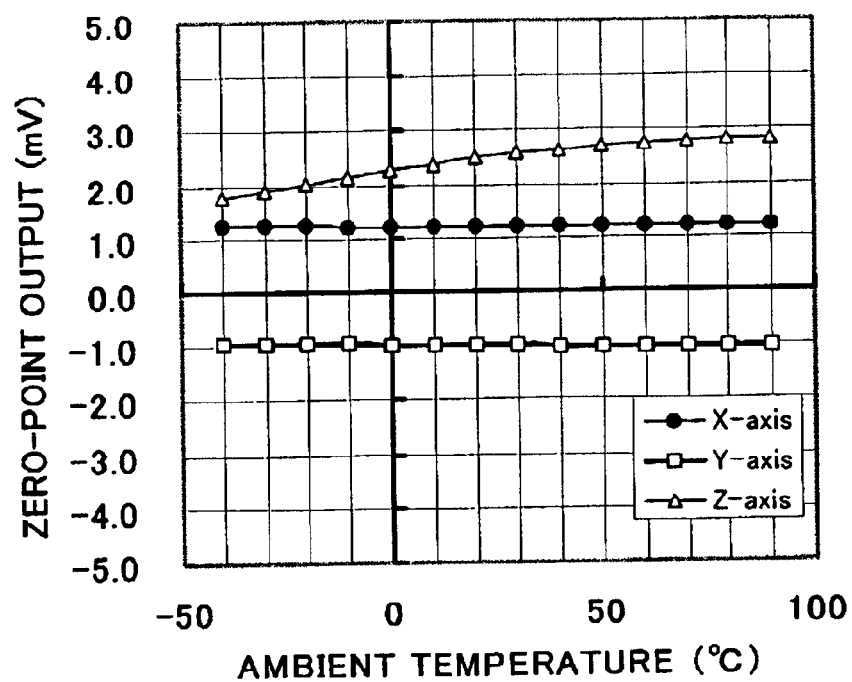

FIGS. 6A and 6B are graphs showing variations of the sensitivity and zero-point output of the acceleration sensor 10, respectively, depending on ambient temperatures. The acceleration measuring apparatus has a temperature sensor 6 to compensate the ambient temperature variations.

Sensitivities and zero-point outputs of the acceleration measuring apparatus at ambient temperatures of −20° C., 25° C., and 50° C. are shown in TABLE 3.

TABLE 3

| Temperature | Sensitivity (mV/G) | | | Zero-point output (mV) | | |
| --- | --- | --- | --- | --- | --- | --- |
| T° C. | Vxs(T) | Vys(T) | Vzs(T) | Vx0(T) | Vy0(T) | Vz0(T) |
| −20° C. | 367 | 378 | 404 | 122 | −96 | 204 |
| 25° C. | 350 | 360 | 400 | 120 | −100 | 250 |
| 50° C. | 344 | 354 | 403 | 119 | −102 | 266 |

To determine a temperature function of sensitivity and a temperature function of zero-point output, quadratic approximation was performed for the values of sensitivity and zero-point output shown in TABLE 3. Then, the following formulas were obtained.

Temperature function of x-axis sensitivity: $0.0020T^2-0.388T+358.5$

Temperature function of y-axis sensitivity: $0.0023T^2-0.411T+368.9$

Temperature function of z-axis sensitivity: $0.0030T^2-0.104T+400.7$

Temperature function of x-axis zero-point output: $0.00006T^2-0.045T+121.1$

Temperature function of y-axis zero-point output: $0.0001T^2-0.090T-97.8$

Temperature function of z-axis zero-point output: $-0.0055T^2+1.050T+227.2$

These temperature functions were stored in the memory 5a. A sensitivity (T) and a zero-point output (T) for an ambient temperature measured by the temperature sensor 6 were determined, and the microprocessor 5 performed a calibration calculation expressed by the following formula using the measured output to determine the acceleration.

Calibrated acceleration output=(output of each detected acceleration component−zero-point output (T))/sensitivity (T)

Varying the ambient temperature from −40° C. to 85° C., measurement was made by applying a known acceleration. Then, a detection error of 3% or lower was provided.

As described above, since the acceleration sensor is set in two different positions in which the gravitational acceleration direction is slightly inclined with respect to any of the orthogonal coordinate axes, the acceleration measuring apparatus of the invention can calibrate the sensitivity (1G output) and the zero-point output, and since the output is corrected by the calibrated values, the acceleration measuring apparatus of the invention can provide an output portional to the acceleration applied to the sensor even if it has a charecteristic variation due to production variation of the sensor or measuring circuit. Furthermore, any temperature drift of the sensor can be corrected because the calibrated values of sensitivity and zero-point output, which depend on temperature, are obtained.

Furthermore, since the angle of inclination is small and two-step calibration is possible, the calibration apparatus is simplified, and an inexpensive and highly precise acceleration measuring apparatus is provided.

What is claimed is:

1. An acceleration measuring apparatus comprising:
   an acceleration sensor that detects components of an acceleration to be measured and produces an output based on each of the detected components in each direction of at least two mutually perpendicular axes of orthogonal coordinates for the acceleration sensor,
   a holding means that holds the acceleration sensor at at least two different positions, the acceleration sensor axes at one of said positions each being at an angle, with the gravitational acceleration direction, that is different from that at the other of said positions, and
   a processing circuit that develops calibration parameters based on a gravitational output by each component in the at least two axis directions of the gravitational acceleration, measured by the acceleration sensor positioned at each of the at least two different positions, and that calibrates the output, produced by the acceleration sensor based on each of the detected components of the acceleration to be measured in each of the at least two axis directions, by using the calibration parameters to provide a calibrated output.

2. An acceleration measuring apparatus as set forth in claim 1, wherein the acceleration sensor detects each component of the acceleration to be measured in each direction of three mutually perpendicular axes of the orthogonal coordinates for the acceleration sensor, and produces the output based on each of the detected components, and
   the holding means holds the acceleration sensor at only two of said different positions, the acceleration sensor axes at the one position each being at an angle, with the gravitational acceleration direction, that is different from that at the other position.

3. An acceleration measuring apparatus as set forth in claim 2, wherein the calibration parameters include an output per unit magnitude of acceleration (hereinafter called "sensitivity") in each of the three axis directions of the acceleration sensor and an output of the acceleration sensor in each of the three axis directions without applied acceleration (hereinafter called "zero-point output").

4. An acceleration measuring apparatus as set forth in claim 3, wherein the processing circuit further comprises a memory in which the developed calibration parameters are stored, and calibrates the output, produced by the acceleration sensor based on each of the detected components of the acceleration to be measured in each of the three axis directions, by using the stored calibration parameters to provide the calibrated output.

5. An acceleration measuring apparatus as set forth in claim 3, wherein the acceleration sensor held at the one position of the two different positions has an axis, among the three mutually perpendicular axes, which is identical with the gravitational acceleration direction, and, when the acceleration sensor is held at the other position, this axis is at an angle with the gravitational acceleration direction.

6. An acceleration measuring apparatus as set forth in claim 3, wherein the processing circuit calibrates the output produced by the acceleration sensor based on each of the detected components of the acceleration in each of the three axis directions by using the sensitivity and the zero-point output in each of the three axis directions, according to the following equation:

Calibrated output=(the output based on each of the detected components of the acceleration–the zero-point output)/the sensitivity.

7. An acceleration measuring apparatus as set forth in claim 2, wherein the acceleration measuring apparatus further comprises a means for measuring an ambient temperature, and the processing circuit develops temperature functions of calibration parameters, based on the gravitational output by each component in the three axis directions of the gravitational acceleration measured by the acceleration sensor positioned at each of the two different positions, and calibrates the output, produced by the acceleration sensor based on each of the detected components of the acceleration, by using the calibration parameters obtained with the ambient temperature by the temperature functions of the calibration parameters to provide the calibrated output.

8. An acceleration measuring apparatus as set forth in claim 7, wherein the temperature functions of the calibration parameters include a temperature function of an output per unit magnitude of acceleration (hereinafter called "temperature function of sensitivity") in each of the three axis directions of the acceleration sensor and a temperature function of an output of the acceleration sensor in each of the three axis directions without applied acceleration (hereinafter called "temperature function of zero-point output").

9. An acceleration measuring apparatus as set forth in claim 8, wherein the processing circuit further comprises a memory in which the developed temperature functions of calibration parameters are stored, and calibrates the output produced by the acceleration sensor based on each of the detected components of the acceleration to be measured in each of the three axis directions by using calibration parameters at the ambient temperature obtained with the ambient temperature by the stored temperature functions of calibration parameter to provide the calibrated output.

10. An acceleration measuring apparatus as set forth in claim 8, wherein the acceleration sensor, held at the one position of the two different positions, has an axis among the three mutually perpendicular axes which is identical with the gravitational acceleration direction, and, when the acceleration sensor is held at the other position, this axis is at an angle with the gravitational acceleration direction.

11. An acceleration measuring apparatus as set forth in claim 8, wherein the processing circuit calibrates the output produced by the acceleration sensor based on each of the detected components of the acceleration to be measured in each of the three axis directions by using the sensitivity and the zero-point output at the ambient temperature calculated with the ambient temperature by the temperature functions of sensitivity and the temperature functions of zero-point output, respectively, according to the following equation:

Calibrated output=(the output based on each of the detected component components of the acceleration–the zero-point output)/the sensitivity.

12. A method of measuring acceleration, comprising the steps of:
holding an acceleration sensor at at least two different positions, the acceleration sensor axes at one of said positions each being at an angle, with the gravitational acceleration direction, that is different from that at the other of said positions;
developing calibration parameters based on a gravitational output by each component of the gravitational acceleration, in at least two axis directions of at least two mutually perpendicular axes of orthogonal coordinates for the acceleration sensor, which is measured by the acceleration sensor positioned at each of the at least two different positions;
detecting each component of an acceleration to be measured and producing an output based on each of the detected components in each direction of the at least two mutually perpendicular axes of the orthogonal coordinates for the acceleration sensor; and
calibrating the output produced by the acceleration sensor based on each of the detected components of the acceleration to be measured in each of the at least two axis directions by using the calibration parameters to provide a calibrated output.

13. The method as set forth in claim 12, wherein
the acceleration sensor is held at only two of said different positions, the acceleration sensor axes at one of said positions each being at an angle, with the gravitational acceleration direction, that is different from that at the other of said positions, and
the acceleration sensor detects each component of the acceleration to be measured in each direction of three mutually perpendicular axes of the orthogonal coordinates for the acceleration sensor, and produces the output based on each of the detected components.

14. The method as set forth in claim 13, wherein
the calibration parameters include an output per unit magnitude of acceleration (hereinafter called "sensitivity") in each of the three axis directions of the acceleration sensor and an output of the acceleration sensor in each of the three axis directions without applied acceleration (hereinafter called "zero-point output").

15. The method as set forth in claim 14, further comprising the step of storing the developed calibration parameters, and wherein, in the step of calibrating the output, the output produced by the acceleration sensor based on each of the detected components of the acceleration to be measured in each of the three axis directions is calibrated by using the stored calibration parameters to provide the calibrated output.

16. The method as set forth in claim 14, wherein the acceleration sensor held at the one position of the two different positions has an axis, among the three mutually perpendicular axes, which is identical with the gravitational acceleration direction, and when the acceleration sensor is held at the other position, this axis is at an angle with the gravitational acceleration direction.

17. The method as set forth in claim 14, wherein, in the step of calibrating the output, the output produced by the acceleration sensor based on each of the detected components of the acceleration to be measured in each of the three axis directions is calibrated by using the sensitivity and the zero-point output in each of the three axis directions, according to the following equation:

Calibrated output=(the output based on each of the detected components of the acceleration−the zero-point output)/the sensitivity.

18. The method as set forth in claim 13, wherein the method further comprises the step of measuring an ambient temperature, and wherein, in the step of developing calibration parameters, temperature functions of calibration parameters are developed, based on the gravitational output by each component in the three axis directions of the gravitational acceleration measured by the acceleration sensor positioned at each of the two different positions, and in the step of calibrating the output, the output produced by the acceleration sensor based on each of the detected components of the acceleration to be measured is calibrated by using the calibration parameters obtained with the ambient temperature by the temperature functions of calibration parameters to provide the calibrated output.

19. The method as set forth in claim 18, wherein the temperature functions of calibration parameters include a temperature function of an output per unit magnitude of acceleration (hereinafter called "temperature function of sensitivity") in each of the three axis directions of the acceleration sensor and a temperature function of an output of the acceleration sensor in each of the three axis directions without applied acceleration (hereinafter called "temperature function of zero-point output").

20. The method as set forth in claim 19, further comprising the step of storing the developed temperature functions of calibration parameters, and wherein, in the step of calibrating the output, the output produced by the acceleration sensor based on each of the detected components of the acceleration to be measured in each of the three axis directions is calibrated by using calibration parameters at the ambient temperature obtained with the ambient temperature by the stored temperature functions of calibration parameters to provide the calibrated output.

21. The method as set forth in claim 19, wherein the acceleration sensor, held at the one position of the two different positions, has an axis among the three mutually perpendicular axes which is identical with the gravitational acceleration direction, and when the acceleration sensor is held at the other position, this axis is at an angle with the gravitational acceleration direction.

22. The method as set forth in claim 19, wherein, in the step of calibrating the output, the output produced by the acceleration sensor based on each of the detected components of the acceleration to be measured in each of the three axis directions is calibrated by using the sensitivity and the zero-point output at the ambient temperature calculated with the ambient temperature by the temperature functions of sensitivity and the temperature functions of zero-point output, respectively, according to the following equation:

Calibrated output=(the output based on each of the detected components of the acceleration−the zero-point output)/the sensitivity.

* * * * *